US008814170B2

(12) United States Patent
Okamura et al.

(10) Patent No.: US 8,814,170 B2
(45) Date of Patent: Aug. 26, 2014

(54) ANNULAR SEAL MEMBER (75) Inventors: Kei Okamura, Kariya (JP); Junichi Fukuda, Kariya (JP); Yoshitake Hisada, Kariya (JP)

(73) Assignees: Advics Co., Ltd., Kariya-shi, Aichi-ken (JP); Denso Corporation, Kariya-shi, Aichi-ken (JP)

( * ) Notice: Subject to any disclaimer, the term of this patent is extended or adjusted under 35 U.S.C. 154(b) by 22 days.

(21) Appl. No.: 13/480,902

(22) Filed: May 25, 2012

(65) Prior Publication Data
US 2012/0299249 A1 Nov. 29, 2012

(30) Foreign Application Priority Data

May 25, 2011 (JP) ................................. 2011-117160

(51) Int. Cl.
*F16J 15/32* (2006.01)
(52) U.S. Cl.
USPC ........... 277/549; 277/436; 277/437; 277/438; 277/439; 277/551; 277/552; 277/560
(58) Field of Classification Search
USPC .................. 277/436–439, 549, 551, 552, 560
See application file for complete search history.

(56) References Cited

U.S. PATENT DOCUMENTS

| 2,489,715 | A | * | 11/1949 | Mark, Jr. et al. | 277/436 |
|---|---|---|---|---|---|
| 2,506,069 | A | * | 5/1950 | Dalton | 175/325.5 |
| 2,844,423 | A | * | 7/1958 | Arnold | 277/436 |
| 2,844,424 | A | * | 7/1958 | Goetze | 277/436 |
| 2,893,795 | A | * | 7/1959 | Dooling | 277/436 |
| 3,123,367 | A | * | 3/1964 | Brummer et al. | 277/574 |
| 3,144,256 | A | * | 8/1964 | Wright | 277/436 |
| 3,720,418 | A | * | 3/1973 | Berg | 277/551 |
| 4,284,280 | A | * | 8/1981 | Bertram et al. | 277/558 |
| 4,337,956 | A | * | 7/1982 | Hopper | 277/552 |
| 4,417,503 | A | * | 11/1983 | Izumi | 92/240 |
| 4,580,996 | A | * | 4/1986 | Brissette | 464/133 |
| 4,669,737 | A | * | 6/1987 | Diffenderfer | 277/551 |
| 5,050,892 | A | * | 9/1991 | Kawai et al. | 277/436 |
| 5,328,178 | A | * | 7/1994 | Nies | 277/438 |
| 5,507,505 | A | * | 4/1996 | von-Arndt et al. | 277/560 |
| 5,511,464 | A | * | 4/1996 | Cezanne et al. | 92/240 |
| 5,524,904 | A | * | 6/1996 | Willi et al. | 277/552 |
| 5,553,869 | A | * | 9/1996 | Stamback | 277/502 |
| 5,794,940 | A | * | 8/1998 | Brueggmann | 277/364 |
| 5,860,656 | A | * | 1/1999 | Obata et al. | 277/559 |

(Continued)

FOREIGN PATENT DOCUMENTS

JP 2008-144784 A 6/2008

*Primary Examiner* — Kristina Fulton
*Assistant Examiner* — Eugene G Byrd
(74) *Attorney, Agent, or Firm* — Buchanan Ingersoll & Rooney P.C.

(57) ABSTRACT

An annular seal member configured to seal a gap between a shaft hole and a shaft inserted into the shaft hole, the annular seal member comprises: an annular base part; an annular lip, which includes a lip edge that is configured to be contact with one of a hole face of a shaft hole and an outer periphery of a shaft, the one of which is a seal mating face; a first convex part, a second convex part and a passage recess, which is provided at a face of the base part facing the seal mating face; a concave part, which is formed at a position between the second convex part and the base end portion of the annular lip, and which has a circumferential size larger than a recess width of the passage recess.

4 Claims, 6 Drawing Sheets (56) References Cited

U.S. PATENT DOCUMENTS

| | | | |
|---|---|---|---|
| 6,029,979 A * | 2/2000 | Grosspietsch et al. | 277/434 |
| 6,113,108 A * | 9/2000 | Friend et al. | 277/549 |
| 6,401,322 B1 * | 6/2002 | Matsushima | 29/460 |
| 6,557,857 B1 * | 5/2003 | Goodman | 277/549 |
| 6,764,079 B1 * | 7/2004 | Hegemier et al. | 277/502 |
| 7,670,111 B2 * | 3/2010 | Maass et al. | 415/230 |
| 8,276,919 B2 * | 10/2012 | Abe | 277/551 |
| 2001/0030398 A1 * | 10/2001 | Hosokawa et al. | 277/549 |
| 2004/0239041 A1 * | 12/2004 | Morimoto et al. | 277/549 |
| 2005/0206089 A1 * | 9/2005 | Chen | 277/549 |
| 2006/0290068 A1 * | 12/2006 | Berdichevsky et al. | 277/549 |
| 2007/0138750 A1 * | 6/2007 | Warnecke et al. | 277/549 |
| 2007/0170656 A1 * | 7/2007 | Schleker et al. | 277/549 |
| 2007/0296161 A1 * | 12/2007 | Dudman | 277/500 |
| 2008/0007013 A1 * | 1/2008 | Sanada | 277/549 |
| 2008/0067755 A1 * | 3/2008 | Morimoto et al. | 277/549 |
| 2008/0217863 A1 * | 9/2008 | Beatty | 277/549 |
| 2009/0166982 A1 * | 7/2009 | Kondo et al. | 277/549 |
| 2010/0295253 A1 * | 11/2010 | Tadano et al. | 277/549 |
| 2010/0301566 A1 * | 12/2010 | van Schoor et al. | 277/549 |

* cited by examiner

ANNULAR SEAL MEMBER

CROSS-REFERENCE TO RELATED APPLICATION

This application claims priority from Japanese Patent Application No. 2011-117160 filed on May 25, 2011, the entire subject matter of which is incorporated herein by reference.

TECHNICAL FIELD

This disclosure relates to an annular seal member that is used to seal a gap between a shaft and a shaft hole to be in a check state in a fluid pressure control apparatus or fluid pressure device. The check state is a state, in which a flow of pressure or liquid from one side to the other side of a space partitioned by a seal member is allowed and a flow of the pressure or liquid from the other side to one side is suppressed.

BACKGROUND

For example, JP-A-2008-144784 discloses an example of the annular seal member. The annular seal member (packing) disclosed in JP-A-2008-144784 has an annular base part and a lip part that axially extends from one end of the base part. Also, the annular seal member has a pressure guidance path on an outer periphery of the base part, which guides fluid pressure in a space (a space of a side for which it is required to avoid pressure accumulation) partitioned by a seal part toward a contact part of the lip part with respect to a bottom face of a seal recess.

The annular seal member is accommodated in an annular seal recess and interposes the base part between a shaft and a shaft hole by compressing the base part in an axial direction. A seal edge in vicinity of a free end of the lip part is brought into close contact with a seal mating face (bottom face of the seal recess).

According to the annular seal member disclosed in JP-A-2008-144784, when a fitting interference is excessively increased due to non-uniformity in size and the like (when a diameter of the bottom face of the seal recess is smaller than a diameter of a base end of the lip part), a slit, which is provided as the pressure guidance path, is deformed in the vicinity of the base end of the lip part due to elastic deformation or creep deformation, so that the pressure guidance path is obstructed. Thereby, a force of separating the lip part from the seal mating face (a pressure difference of partitioned spaces A and B, and this is referred to as a valve opening pressure) is to be varied, so that it is unlikely possible to obtain a stable pressure release function.

Also, when many pressure guidance paths are provided or a width of the pressure guidance path (slit) is increased so as to avoid the obstruction of the pressure guidance path, it is not possible to secure a straining force (surface pressure) that uniformly and sufficiently presses an inner diameter side of the annular seal member to an outer periphery of the shaft. As a result, the reliability of the seal is deteriorated, so that a possibility of liquid leakage is increased.

SUMMARY

This disclosure provides at least an annular seal member having a check function, in which even when there is non-uniformity in size, a lip is separated from a surface of a seal object with a small valve opening pressure, so that pressure is stably released from one space (space A) to the other space (space B).

With considering the above, this disclosure provides at least a first aspect to a fourth aspect as an annular seal member configured to seal a gap between a shaft hole and a shaft inserted into the shaft hole.

In a first aspect of this disclosure, an annular seal member configured to seal a gap between a shaft hole and a shaft inserted into the shaft hole, the annular seal member comprises: an annular base part, which is arranged between the shaft hole and the shaft to be diametrically compressed; an annular lip, which axially extends from one end of the base part and includes a lip edge that is configured to be contact with one of a hole face of the shaft hole and an outer periphery of the shaft, the one of which is a seal mating face (in this disclosure, a face to be close contact with the annular lip is referred to as a seal mating face); a first convex part, which is provided at a face of the base part facing the seal mating face, and which diametrically protrudes to contact with the seal mating face due to a fitting interference; a second convex part, which is provided at the face of the base part facing the seal mating face between the first convex part and a base end portion of the annular lip, and which diametrically protrudes; a passage recess, which is provided at the face of the base part facing the seal mating face and extends from the other end of the base part toward the annular lip; and a concave part, which is formed at a position between the second convex part and the base end portion of the annular lip, and which has a circumferential size larger than a recess width of the passage recess.

Meanwhile, in this disclosure, a plurality of convex parts is circumferentially dotted with an interval, and valleys that are formed between the adjacent convex parts are also considered as the passage recess.

In a second aspect of this disclosure, instead of the second convex part of the annular seal member of the first aspect, a concave part having a circumferential size larger than a recess width of the passage recess and communicating with the passage recess is provided so that it is recessed to a surface of the base part facing the seal mating face.

In a third aspect of this disclosure, instead of the second convex part of the annular seal member of the first aspect, a protrusion that contacts the seal mating face to secure a communication space of the passage recess and the concave part around the protrusion is provided at a connection part of the passage recess and the concave part so that it protrudes diametrically.

In addition to the annular seal member of the first aspect, the annular seal member of a first aspect includes a protrusion that contacts the seal mating face to secure a communication space of the passage recess and the concave part around the protrusion.

Meanwhile, in the above-described annular seal member, it may be preferable that a distance from a bottom of the concave part to the seal mating face is larger than a distance from a bottom of a inter-convex concave part, which is formed at a position between the first convex part and the second convex part, or that the second convex part is configured by a continuous ridge in the circumferential direction except for a position of the passage recess.

In the in the above-described annular seal member, the protrusion may be provided in the passage recess and extends from a starting end of the passage recess to an connection part of the passage recess and the recess part, or is provided at an connection part of the passage recess and the recess part.

In the in the above-described annular seal member, the concave part is preferably an annular concave part that continues in the circumferential direction. However, even when the concave part is circumferentially partitioned, the object of this disclosure is realized.

According to the first aspect the annular seal member of the above-described annular seal member is deformed so that as the second convex part is pressed to the seal mating face, and then concave part formed between the second convex part and the annular lip is pushed to be separated from the seal mating face. Therefore, the distance from the bottom of the concave part to the seal mating face is increased, compared to a case where the annular seal member is at a free state. Thereby, even for a product having non-uniformity in size, a pressure introduction space (gap) that enable the valve opening pressure to be applied to the annular lip is stably secured between the concave part and the seal mating face, and the communication state of the passage recess with the pressure introduction space is also secured, so that the stability of the pressure release function is increased.

Also, since the obstruction of the pressure introduction space is suppressed by the second convex part that pushes to separate the concave part from the seal mating face, it is not necessary to increase the number of the passage recesses or to increase the recess width of the passage recess. Accordingly, it is possible to avoid that the lowering of the straining force to be applied to an opposite surface to the side at which the convex part of the annular seal member is formed and the lowering of the reliability of the seal. On the contrary, the straining force is increased by the compression of the second convex part.

According to the second aspect, the concave part formed in the vicinity of the base end portion of the annular lip is recessed, so that the same state is made as the case where the concave part is pushed to be separated from the seal mating face by the second convex part in the annular seal member of the first aspect. Also, in the annular seal member of the third aspect, the protrusion that is provided at the connection part of the passage recess and the concave part is contacted to the seal mating face to secure the communication space of the passage recess and the recess part around the protrusion. Therefore, even in this configuration, it is possible to increase the stability of the pressure release function without lowering the reliability of the seal.

According to the fourth aspect, the protrusion is further provided at the annular seal member of the first aspect. Therefore, the pressure introduction space and the communication state of the passage recess with the pressure introduction space are secured more stably, and the stability of the pressure release function is further improved.

According to the above-described annular seal member, the distance from the bottom of the concave part to the seal mating face is larger than the distance from the bottom of the inter-convex concave part formed between the first convex part and the second convex part, so that the concave part between the second convex part and the annular lip remains even when the seal member is compressed such that the inter-convex concave part is disappeared, and thus the pressure introduction space is secured more positively.

According to the above-described annular seal member, the concave part is annular, so that the overall circumferential region of the annular lip functions as a valve. Thus, it is possible to further suppress the non-uniformity in the valve opening pressure and to improve the seal performance and the durability of the annular lip.

According to the above-described annular seal member, the second convex part is configured by the continuous ridge in the circumferential direction except for a position of the passage recess, so that the variation at the respective circumferential parts of the concave part (pressure introduction space) is suppressed. Thus, the contact pressure (surface pressure) of the annular lip to the seal mating face is uniformed at the respective circumferential parts, so that the seal is stabilized.

Additionally, in the above-described annular seal member, the protrusion may be provided in the passage recess and extends from the starting end of the passage recess to the connection part of the passage recess and the recess part. Thus, it is possible to securely suppress the obstruction of the passage recess by the protrusion.

Also, in the above-described annular seal member, the protrusion may be provided at the connection part of the passage recess and the recess part, so that the passage recess is not narrowed by the protrusion. Therefore, it is possible to reduce a variation area of the fitting interference (i.e., variation area of a compressive reactive force) at the respective circumferential parts of the base part by narrowing the width of the passage recess, so that the valve opening pressure is stabilized.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, illustrative embodiments of an annular seal member of this disclosure will be described with reference to FIGS. 1 to 10. An annular seal member 10 of a first illustrative embodiment shown in FIG. 1 has an annular base part 1, an annular lip 2 that axially extends from one end of the base part, a first convex part 3, a second convex part 4, a plurality of passage recesses 5 and a concave part 6. A rubber having hardness of 70 to 80 IRHD is used as the material.

Figure 1:
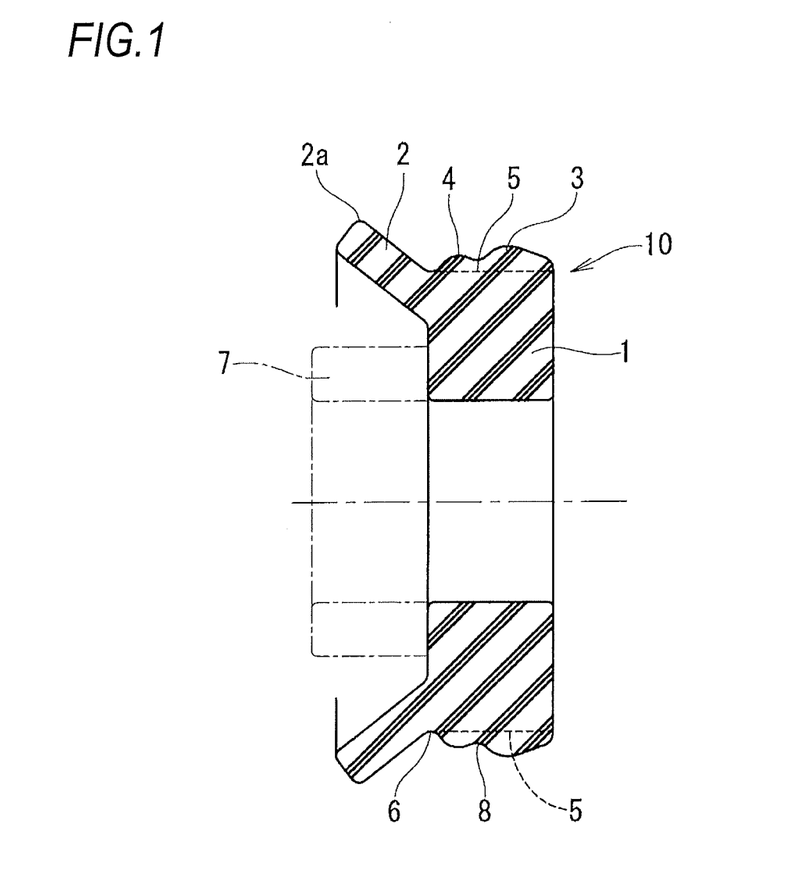
FIG. 1 is a sectional view illustrating an example of an annular seal member of this disclosure.

The base part 1 of the annular seal member is inserted into a seal recess, which is formed at any one side of a shaft hole (which will be described later) and a shaft to be inserted into the shaft hole, so that it is arranged between a hole face of the shaft hole and an outer periphery of the shaft.

The annular lip 2, which is referred to as an outer periphery lip, obliquely extends from an one end of outer periphery of the base part 1 in an axial and diametrically outer direction and has a lip edge 2a that is closely contacted to a seal mating face (for the shown seal member, a hole face of the shaft hole) in the vicinity of a free end. In the meantime, an annular lip 7, which is referred to as an inner periphery lip, may be also provided at one end of an inner periphery of the base part 1, depending on purposes of the seal.

The first convex part 3 is provided on a face (an outer periphery of the base part 1 in FIG. 1) of the base part 1 facing the seal mating face so that it protrudes diametrically. An outer diameter of the first convex part 3 at a free state is larger than a hole diameter of the shaft hole. By this setting, an area exceeding the hole diameter is enabled as an fitting interference to diametrically compress the base part 1, so that the inner periphery of the base part is pressed to an outer periphery of the shaft with a straining force, thereby sealing the outer periphery of the shaft.

The second convex part 4 is also provided at the face of the base part 1 facing the seal mating face so that it protrudes diametrically. The second convex part 4 is arranged between the first convex part 3 and a base end portion of the annular lip 2. In a case of a seal member for sealing an outer periphery of a shaft having a diameter φ of 7 mm, a height of the second convex part 4 (a height from a bottom of the concave part 6) may have about 0.2 mm.

Both the first convex part 3 and the second convex part 4 are configured by a continuous ridge in the circumferential direction except for the positions of the passage recesses 5. The convex part having above-described shape is preferable because it serves for stabilization of the shape of the concave part 6, uniformalization of contact surface pressures to the shaft of the base part 1 at respective circumferential parts of the concave part, and uniformalization of contact surface pressures to the seal mating face at respective circumferential parts of the annular lip. However, a convex part having any shape (for example, hemispherical shape, pyramid shape, truncated shape and the like) may be circumferentially dotted with an interval to achieve the effect of this disclosure.

Also, the first convex part 3 and the second convex part 4 are shaped into the shown convex parts, of which a lead end has a convex curved surface, since the shape is to be easily molded. However, a lead end of the convex part has an angular shape in a sectional surface is also possible.

The passage recess 5 is provided at the base part 1 at a side at which the annular lip 2 is provided (an outer side of the base part in FIG. 1) and extends from the other end of the base part (a right end in FIG. 1) toward the annular lip 2. As shown, when a plurality of the passage recesses 5 is circumferentially provided with an equal interval, it is possible to narrow a recess width and to minify a variation area of the fitting interference at the respective circumferential parts of the base part 1.

In a case of a seal member for sealing an outer periphery of a shaft having a diameter φ of 7 mm, the passage recess 5 may have a recess width of about 0.2 to 0.3 mm and a depth of about 0.5 mm.

The concave part 6 is formed at a position between the second convex part 4 and the base end portion of the annular lip 2. A circumferential size of the concave part 6 is made to be larger than the recess width of the passage recess 5, so that the concave part 6 is made to positively remain at a using state of the annular seal member 10. The concave part forms a pressure introduction space 14 (FIG. 2) to apply a valve opening pressure to the annular lip 2 at the position between the concave part and the seal mating face.

In the meantime, because the shown annular concave part can uses entire area in the circumferential direction of the annular lip 2 to function as a valve, the concave part 6 is preferable. However, the concave part may have a shape that does not continue in the circumference direction. Also, it is preferable that a distance from the bottom of the concave part 6 to the seal mating face is larger than a distance from the bottom of a inter-convex concave part 8 formed between the first convex part 3 and the second convex part 4, as shown in FIG. 1. According to this configuration, the obstruction of the concave part 6 is further suppressed.

Figure 2:
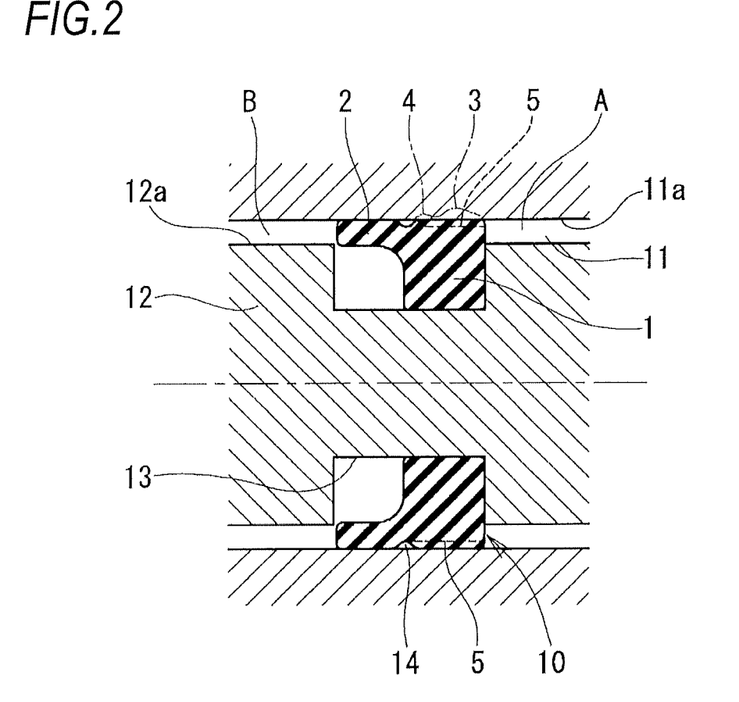
FIG. 2 is a sectional view illustrating an example in which the annular seal member of FIG. 1 is used.

As shown in FIG. 2, in order to configure a seal part having a check function, the annular seal member 10 of the first illustrative embodiment as described above is arranged between a shaft hole 11 and the like and a shaft 12 to be inserted into the shaft hole provided in a fluid pressure device.

In a case of the seal member of FIG. 2, an annular seal recess 13 is provided on an outer periphery of the shaft 12, and the annular seal member 10 is accommodated in the annular seal recess 13 and is interposed between the shaft hole 11 and the shaft 12. At this time, since the first convex part 3 has the fitting interference, the base part 1 is diametrically compressed, and then an inner diameter side of the base part is pressed toward the outer periphery of the shaft 12 with a straining force, so that an interface between the base part and an outer periphery 12a of the shaft 12 is sealed so that the fluid is not leaked.

At the same time, the second convex part 4 is also diametrically compressed, so that the bottom of the concave part 6 is pushed in a diametrically inner direction. Thus, the pressure introduction space 14 to apply the valve opening pressure to the annular lip 2 is formed between the concave part and a hole face (seal mating face in this disclosure) 11a of the shaft hole 11.

The pressure introduction space 14 communicates with a space A via the passage recesses 5. Thereby, when a pressure of the space A exceeds a prescribed value, the annular lip 2 is pushed to be separated from the seal mating face due to a pressure difference between the space A and a space B, and then the valve by the annular lip 2 is opened, so that the excessive pressure of the space A is discharged to the space B.

On the other hand, when the pressure difference between the spaces A and B is below the vale opening pressure, a lip edge 2a of the annular lip 2 is brought into close contact with the seal mating face. At this state, when the pressure of the space B exceeds the pressure of the space A, the lip edge 2a is strongly pressed by the seal mating face. Therefore, the pressure or liquid is not leaked from the space B to the space A.

Figure 3:
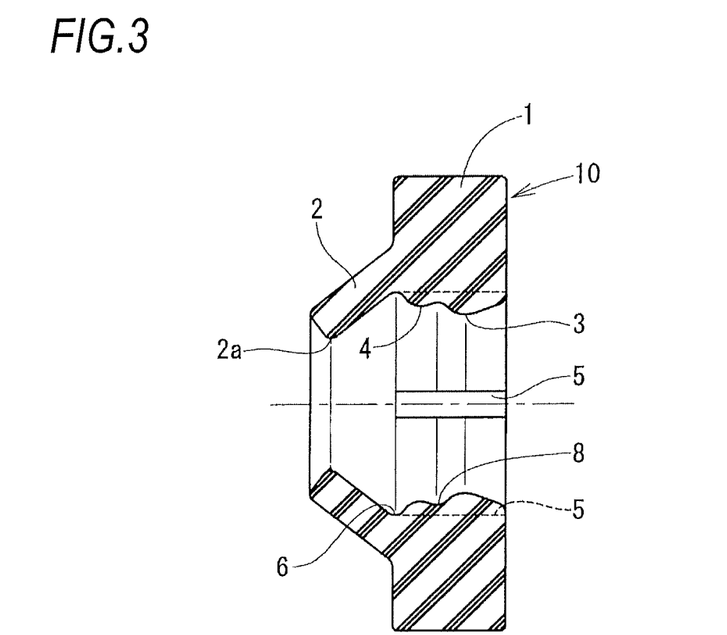
FIG. 3 is a sectional view illustrating another example of an annular seal member of this disclosure.

FIG. 3 illustrates an annular seal member 10 of a second illustrative embodiment. The second illustrative embodiment is different from the first illustrative embodiment, in that the annular lip 2, the first convex part 3, the second convex part 4, the plurality of passage recesses 5 and the concave part 6 are provided at the inner diameter side of the base part 1 having an annular shape and the lip edge 2a of the annular lip is closely contacted to the outer periphery of the shaft. The operations and effects are the substantially same. In the second illustrative embodiment, an annular seal recess may be provided on a hole face of the shaft hole and the annular seal member may be accommodated thereto.

Figure 4:
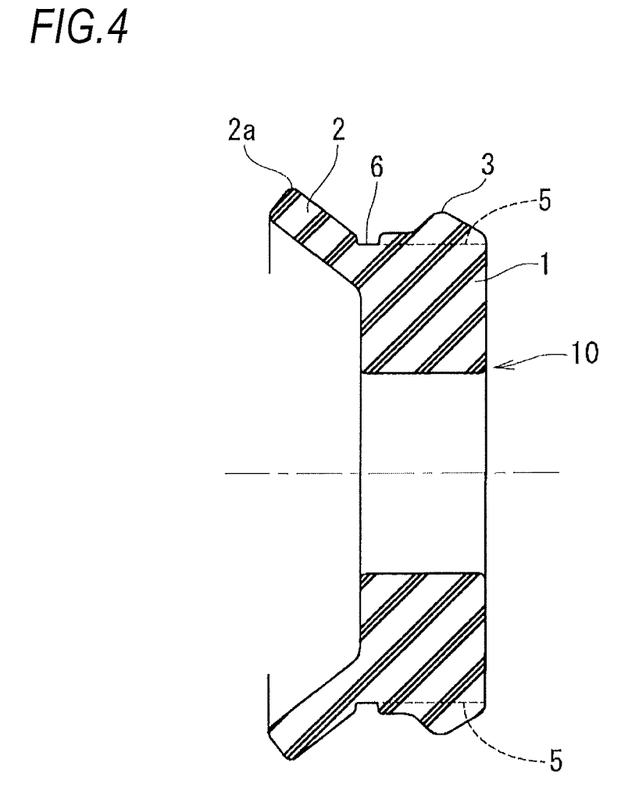
FIG. 4 is a sectional view illustrating another example of an annular seal member of this disclosure.

FIG. 4 illustrates an annular seal member 10 of a third illustrative embodiment. Instead of the second convex part 4 of the first illustrative embodiment, the concave part 6 that has a circumferential size larger than the recess width of the passage recess 5 and communicates with the passage recess 5 is provided. Further, the concave part 6 is formed to be recessed in a face (an outer periphery in FIG. 4) of the base part 1 facing the seal mating face.

This structure makes a state similar to the state, in which the second convex part 4 is pushed to separate the concave part 6 from the seal mating face in the first illustrative embodiment. Accordingly, the obstruction of the concave part 6 is further suppressed, compared to the prior art.

Meanwhile, in the third illustrative embodiment, even when the diametrical compression amount of the base part 1 is increased due to the non-uniformity in size, a separation amount of the concave part from the seal mating face is little changed. To the contrary, in the first illustrative embodiment, as the diametrical compression amount of the second convex part 4 is increased, the separation amount of the concave part 6 from the seal mating face is increased. Therefore, in order to more stably secure the pressure introduction space, the first illustrative embodiment may be preferable than the third illustrative embodiment.

Figure 5:
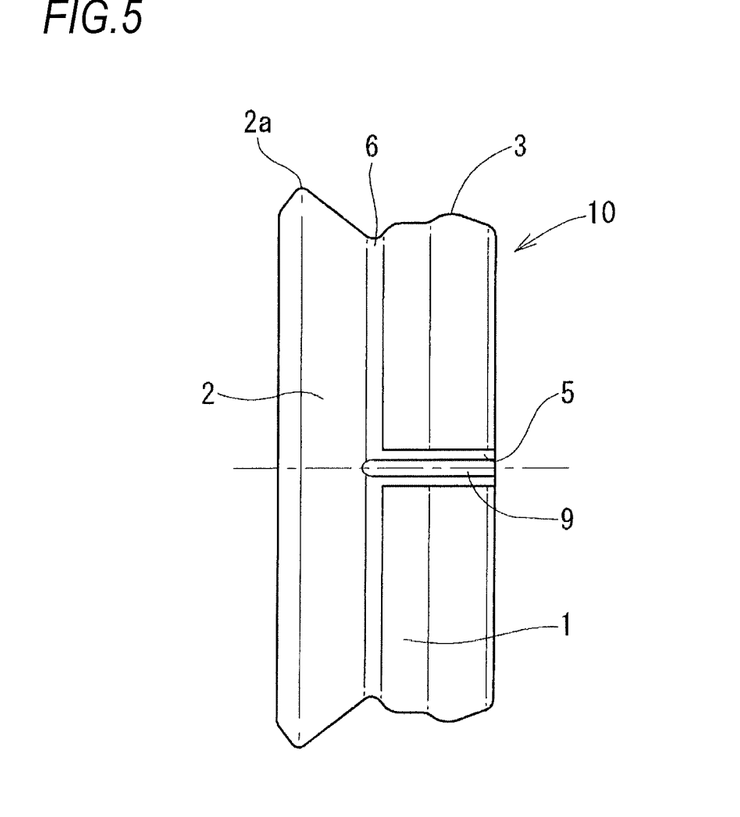
FIG. 5 is a sectional view illustrating another example of an annular seal member of this disclosure.
Figure 10:
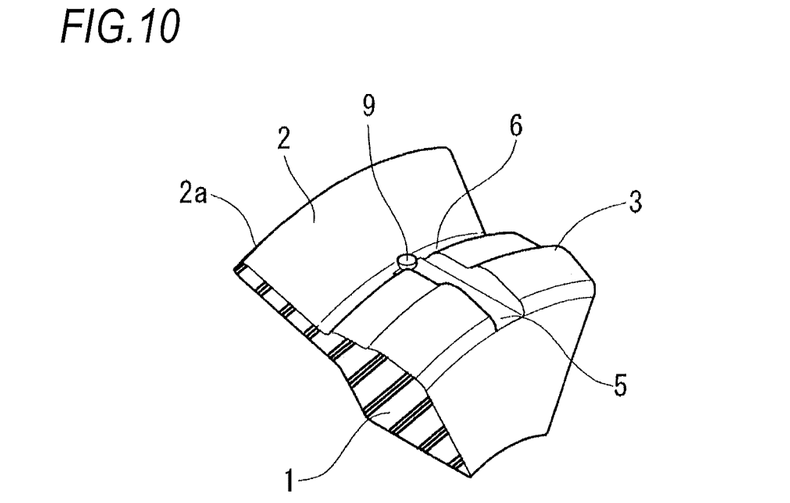
FIG. 10 is an enlarged perspective view illustrating one of main parts of a modified embodiment of a protrusion provided at a connection part of a passage recess and a concave part.

FIG. 5 illustrates an annular seal member 10 of a fourth illustrative embodiment. The fourth illustrative embodiment is different from the first illustrative embodiment, in that a protrusion 9, which contacts the seal mating face to secure a communication space between the passage recess 5 and the concave part 6 around the protrusion, is provided at a connection part of the passage recess 5 and the concave part 6 and diametrically protrudes, instead of the second convex part 4 of the second illustrative embodiment. A shape of the protrusion 9 is not particularly limited. For example, an elongated ridge or a small protrusion as shown in FIG. 10 may be used.

Figure 6:
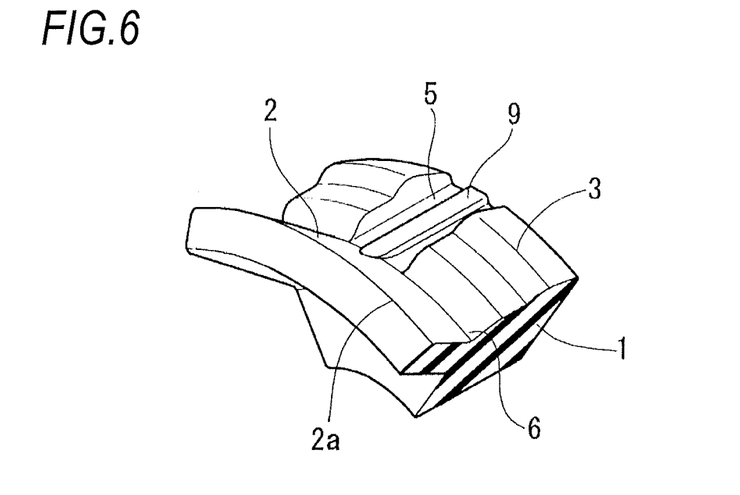
FIG. 6 is an enlarged perspective view illustrating one of main parts of the annular seam member of FIG. 5.
Figure 7:
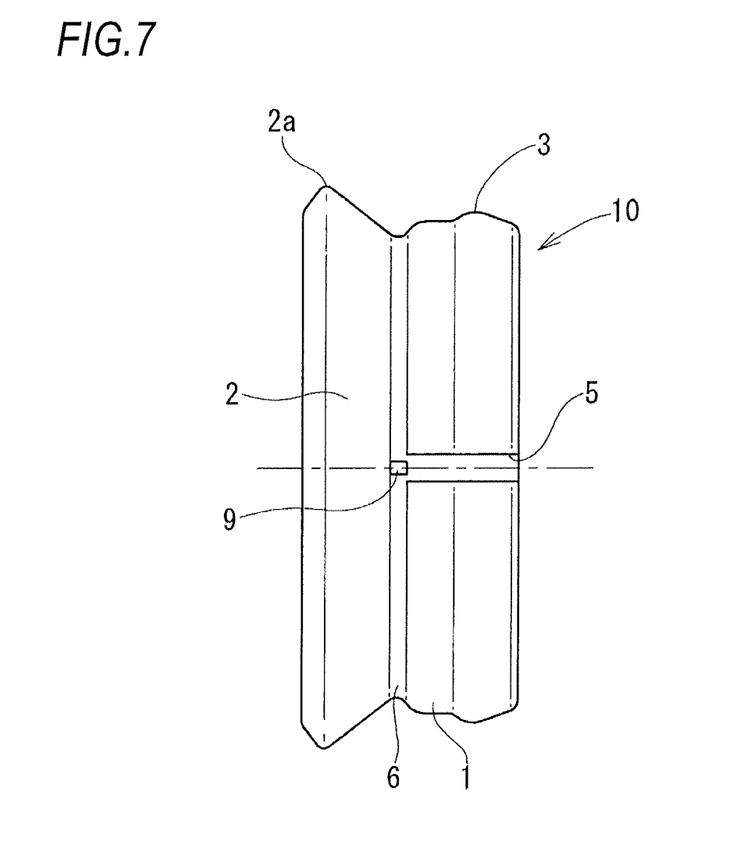
FIG. 7 is a plan view illustrating another example of an annular seal member of this disclosure.
Figure 8:
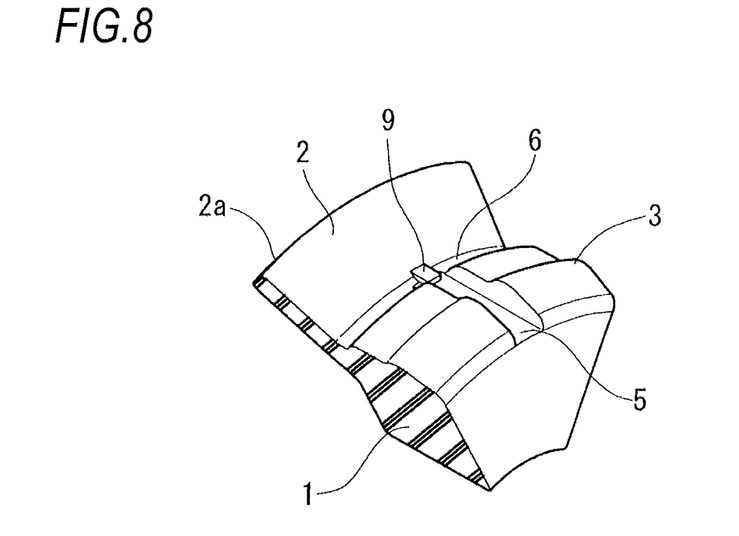
FIG. 8 is an enlarged perspective view illustrating one of main parts of the annular seam member of FIG. 7.

As shown in FIGS. 5 and 6, the protrusion 9 may be provided in the passage recess 5 and extends from a starting end of the passage recess 5 to an connection part of the passage recess 5 and the concave part 6. As shown in FIGS. 7 to 10, the protrusion may be provided at the connection part of the passage recess 5 and the concave part 6. When the protrusion is provided at the connection part of the passage recess 5 and the concave part 6, the entire protrusion 9 may be completely accommodated in the connection part. Alternatively, most of the protrusion 9 may be accommodated in the connection part but the remaining part thereof may not be accommodated therein.

When the protrusion 9 is provided in the passage recess 5 and extends from the starting end of the passage recess 5 to the connection part of the passage recess 5 and the concave part 6, the protrusion 9 serves as a support member, so that the passage recess 5 is suppressed from being obstructed. In this configuration, in a case of a seal member for sealing an outer periphery of a shaft having a diameter φ of 7 mm, the recess width of the passage recess 5 may be increased up to about 0.5 to 1.0 mm without particular problems.

Figure 9:
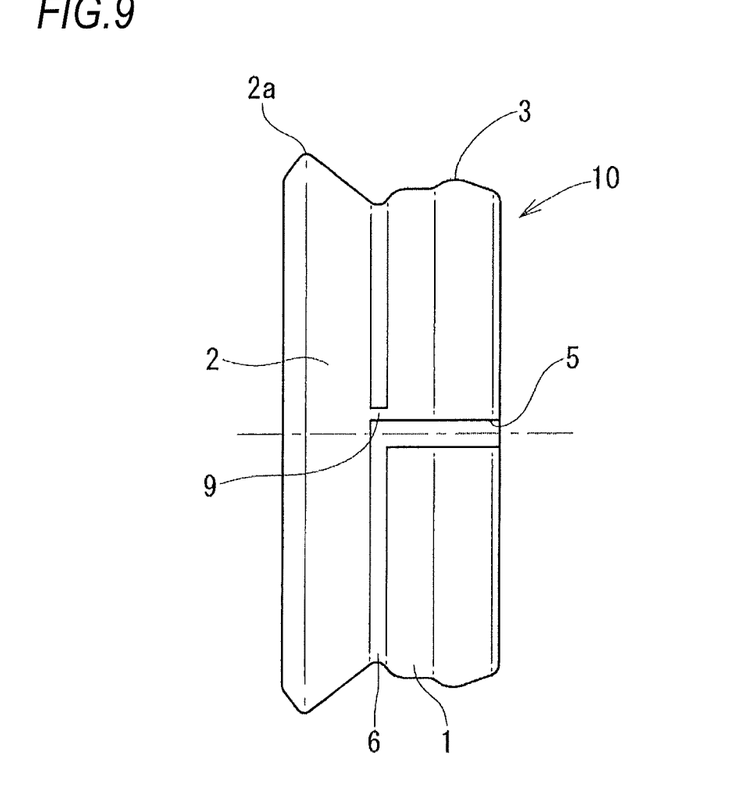
FIG. 9 is a plan view illustrating a case in which a protrusion provided at a connection part of a passage recess and a concave part is biased to one side of the passage recess.

As shown in FIG. 9, the protrusion 9 that is provided at the connection part of the passage recess 5 and the concave part 6 may be arranged so that it is biased to one side of the passage recess 5, rather than a center of the passage recess in the width direction. That is, the protrusion is preferably arranged to not disturb the connection of the passage recess 5 and the concave part 6. In the configuration where the protrusion 9 is provided at the connection part of the passage recess 5, and the concave part 6, the passage recess 5 is not narrowed by the protrusion 9. Therefore, it is possible to uniform the fitting interference at the respective circumferential parts of the base part and to narrow the width of the passage recess 5.

Although not shown, the annular seal member of this disclosure may have a configuration that the protrusion 9 of the fourth illustrative embodiment is further provided into the first illustrative embodiment having the second convex part 4.

In this configuration, the obstruction of the passage recess or concave part is further suppressed.

What is claimed is:

1. An annular seal member configured to seal a gap between a shaft hole and a shaft inserted into the shaft hole, the annular seal member comprising:
    an annular base part, which is arranged between the shaft hole and the shaft to be diametrically compressed;
    an annular lip, which axially extends from one end of the base part and includes a lip edge that is configured to be contact with one of a hole face of the shaft hole and an outer periphery of the shaft, one of which is a seal mating face;
    a first convex part, which is provided at a face of the base part facing the seal mating face and diametrically protrudes, and which is contacted to the seal mating face due to a fitting interference;
    a passage recess, which is provided at the face of the base part facing the seal mating face and extends from the other end of the base part toward the annular lip;
    a concave part, which is provided in vicinity of a base end portion of the annular lip and is provided at the face of the base part facing the seal mating face, and which has a circumferential size larger than a recess width of the passage recess and communicates with the passage recess; and
    a protrusion, which is provided at a connection part of the passage recess and the concave part and diametrically protrudes to contact with the seal mating face to secure a communication space of the passage recess and the concave part around the protrusion.

2. An annular seal member configured to seal a gap between a shaft hole and a shaft inserted into the shaft hole, the annular seal member comprising:
    an annular base part, which is arranged between the shaft hole and the shaft to be diametrically compressed;
    an annular lip, which axially and diametrically extends from one end and is adjacent to a periphery face of the base part facing a seal mating face, includes a lip edge that is configured to be contact with one of a hole face of the shaft hole and an outer periphery of the shaft, the one of which is the seal mating face;
    a first convex part, which is provided at the periphery face of the base part facing the seal mating face, diametrically protrudes to contact with the seal mating face due to a fitting interference;
    a second convex part, which is provided at the periphery face of the base part facing the seal mating face between the first convex part and a base end portion of the annular lip, diametrically protrudes;
    a passage recess, which is provided at the periphery face of the base part facing the seal mating face, extends from the other end of the base part toward the annular lip;
    a concave part, which is formed at a position between the second convex part and the base end portion of the annular lip in the periphery face, has a circumferential size larger than a recess width of the passage recess;
    wherein the annular lip, the first convex part, the second convex part, the passage recess, and the concave part are located at the periphery face; and
    a protrusion, which is provided at a connection part of the passage recess and the concave part, which diametrically protrudes to contact with the seal mating face to secure a communication space of the passage recess and the concave part around the protrusion.

3. The annular seal member according to claim 1, wherein the protrusion is provided in the passage recess and extends from a starting end of the passage recess to the connection part of the passage recess and the concave part.

4. The annular seal member according to claim 1, wherein the protrusion is provided at the connection part of the passage recess and the concave part.

\* \* \* \* \*